(12) United States Patent  
Deng et al.

(10) Patent No.: US 9,345,101 B2
(45) Date of Patent: May 17, 2016

(54) PROTECTION CIRCUIT FOR USE IN CONTROLLING INTEGRATED CIRCUIT OF LIGHT EMITTING DIODE

(71) Applicant: REALTEK SEMICONDUCTOR CORPORATION, Hsinchu (TW)

(72) Inventors: Huan Deng, Suzhou (CN); Chuan Ping Tu, Zhudong Township, Hsinchu County (TW)

(73) Assignee: Realtek Semiconductor Corporation, Hsinchu (TW)

(*) Notice: Subject to any disclaimer, the term of this patent is extended or adjusted under 35 U.S.C. 154(b) by 0 days.

(21) Appl. No.: 14/464,354

(22) Filed: Aug. 20, 2014

(65) Prior Publication Data

US 2015/0054424 A1    Feb. 26, 2015

(30) Foreign Application Priority Data

Aug. 22, 2013  (CN) .......................... 2013 1 0369627

(51) Int. Cl.
*H05B 33/08* (2006.01)

(52) U.S. Cl.
CPC .......... *H05B 33/089* (2013.01); *H05B 33/0827* (2013.01); *Y02B 20/341* (2013.01)

(58) Field of Classification Search
USPC .......... 315/122, 185 R, 186, 209 R, 291, 294, 315/307, 308, 312
See application file for complete search history.

(56) References Cited

U.S. PATENT DOCUMENTS

| 6,147,617 A * | 11/2000 | Kim ....................... G09G 3/006 324/556 |
| 2012/0068714 A1* | 3/2012 | Wang .................. G01R 31/025 324/414 |
| 2012/0242249 A1* | 9/2012 | Yu ...................... H05B 33/0884 315/297 |

FOREIGN PATENT DOCUMENTS

| CN | 102740567 A | 10/2012 |
| JP | 2009-16459 A | 1/2009 |
| TW | 201215219 A1 | 4/2012 |

* cited by examiner

*Primary Examiner* — Thai Pham

(57) ABSTRACT

A protection circuit for use in a controlling integrated circuit of a light emitting diode is provided. The protection circuit includes a voltage division circuit and a voltage reduction circuit. The voltage division circuit is coupled to a terminal of a light emitting diode assembly and configured to generate a division voltage according to a terminal voltage of the terminal. The voltage reduction circuit is coupled to the voltage division circuit and configured to reduce the division voltage of the voltage division circuit.

10 Claims, 4 Drawing Sheets

PROTECTION CIRCUIT FOR USE IN CONTROLLING INTEGRATED CIRCUIT OF LIGHT EMITTING DIODE

This application claims priority to Chinese Patent Application No. 201310369627.X filed on Aug. 22, 2013.

CROSS-REFERENCES TO RELATED APPLICATIONS

Not applicable.

BACKGROUND OF THE INVENTION

1. Field of the Invention

The present invention relates to a protection circuit for use in a controlling integrated circuit (IC) of a light emitting diode (LED). More particularly, the protection circuit of the present invention is for use in a controlling IC of a multi-channel LED manufactured by an advanced process.

2. Descriptions of the Related Art

In the prior art, as the integration degree of the system on chip keeps rising, most of the controlling ICs of multi-channel LEDs have been able to be integrated directly into a general system on chip process.

However, when an advanced process (e.g., a 40 nanometer (nm) process, a 28 nm process or the like) is adopted to manufacture a system on chip, the voltage that the pins of the system on chip can withstand will become more limited. Therefore, when the voltage transmitted to the controlling IC rises instantaneously in case of a dimming off process of an LED assembly or malfunction (e.g., a short circuit) of part of the LEDs of the LED assembly, the rising voltage will exceed the range that the system on chip manufactured by the advanced process can withstand. Accordingly, the conventional controlling IC of the multi-channel LED cannot be integrated directly into the system on chip manufactured by the advanced process.

Accordingly, an urgent need exists in the art to accurately integrate the controlling IC of the multi-channel LED into the system on chip manufactured by the advanced process and ensure normal operation of the controlling IC.

SUMMARY OF THE INVENTION

To solve the aforesaid problem, the present invention provides a protection circuit for use in a controlling IC of an LED, which protects the controlling IC mainly by reducing the voltage input into the controlling IC.

To achieve the aforesaid objective, the present invention provides a protection circuit for use in a controlling IC of an LED. The protection circuit comprises a voltage division circuit and a voltage reduction circuit. The voltage division circuit is coupled to a terminal of an LED assembly and configured to generate a division voltage according to a terminal voltage of the terminal. The voltage reduction circuit is coupled to the voltage division circuit and configured to reduce the division voltage of the voltage division circuit.

With the technical features disclosed above, the protection circuit of the present invention can activate the voltage reduction circuit to reduce the voltage input into the controlling IC according to the voltage variation of the LED so as to achieve the objective of protecting the controlling IC. The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

In the following description, the present invention will be explained with reference to embodiments thereof. However, these embodiments of the present invention are not intended to limit the present invention to any environment, applications or implementations described in these embodiments. Therefore, description of these embodiments is only for purpose of illustration rather than to limit the present invention. It shall be appreciated that, in the following embodiments and the attached drawings, elements unrelated to the present invention are omitted from depiction.

Figure 1:
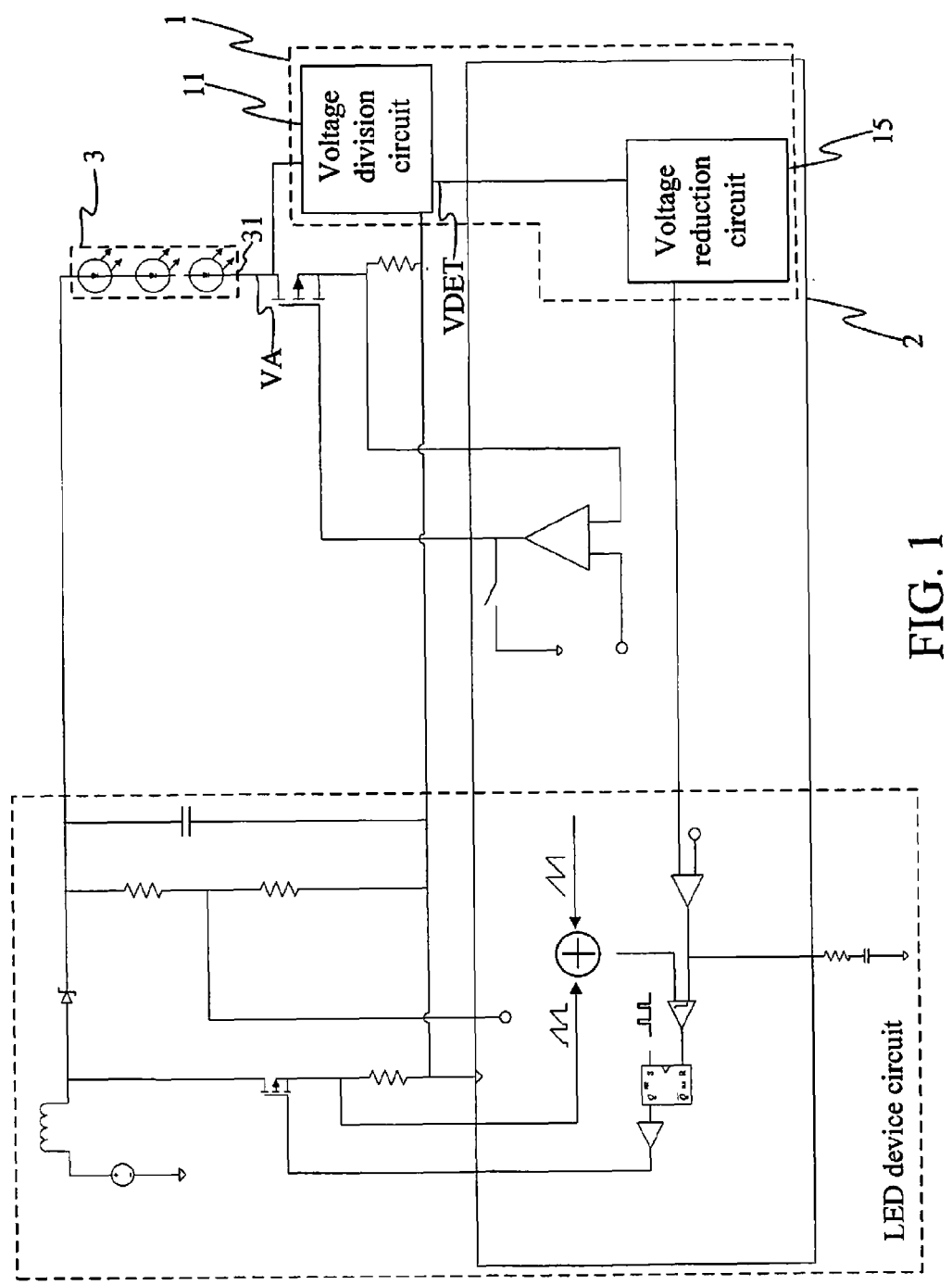
FIG. 1 is a schematic view of a protection circuit according to a first embodiment of the present invention.

Referring to FIG. 1, a schematic view of a protection circuit 1 according to a first embodiment of the present invention is shown therein. The protection circuit 1 is configured to protect a controlling IC 2 of an LED. The protection circuit 1 comprises a voltage division circuit 11 disposed outside the controlling IC 2 of the LED and a voltage reduction circuit 15 disposed in the controlling IC 2 of the LED. It shall be particularly appreciated that, for the conventional LED device circuit illustrated herein, people skilled in the art can readily know the names and the functions of the elements (e.g., conventional elements such as the Schottky diode, the capacitor, the resistor, the inductor, the comparer and the transistor) and can appreciate the functions of the circuits constituted by these elements. However, these elements are not the main technical features of the present invention, so they will not be further described herein. The connection relationships between the main elements of the present invention will be further described hereinbelow.

Specifically, the first embodiment of the present invention is mainly able to proactively reduce the voltage input into the controlling IC 2 of the LED when the LED assembly 3 undergoes a dimming off process to save energy. In detail, the voltage division circuit 11 is coupled to a terminal 31 of an LED assembly 3 and configured to generate a division voltage VDET according to a terminal voltage VA of the terminal 31. In this case, the controlling IC 2 of the LED can withstand the normal division voltage VDET input when the LED assembly 3 operates normally.

However, when the LED assembly 3 undergoes a dimming off process to save energy, the division voltage VDET will rise instantaneously. Accordingly, the voltage reduction circuit 15 coupled to the voltage division circuit 11 can be activated automatically and synchronously to reduce the division voltage VDET of the voltage division circuit 11. In this way, the division voltage VDET input into the controlling IC 2 of the LED will not exceed the voltage value that the controlling IC 2 of the LED can withstand so as to protect the pins, via which the division voltage VDET is input into the controlling IC 2 of the LED, from being damaged. Thus, by activating the voltage reduction circuit to reduce the voltage input into the controlling IC 2 of the LED, the protection circuit 1 can achieve the objective of protecting the controlling IC 2 of the LED when the IC is integrated into the system on chip manufactured by the advanced process.

Figure 2:
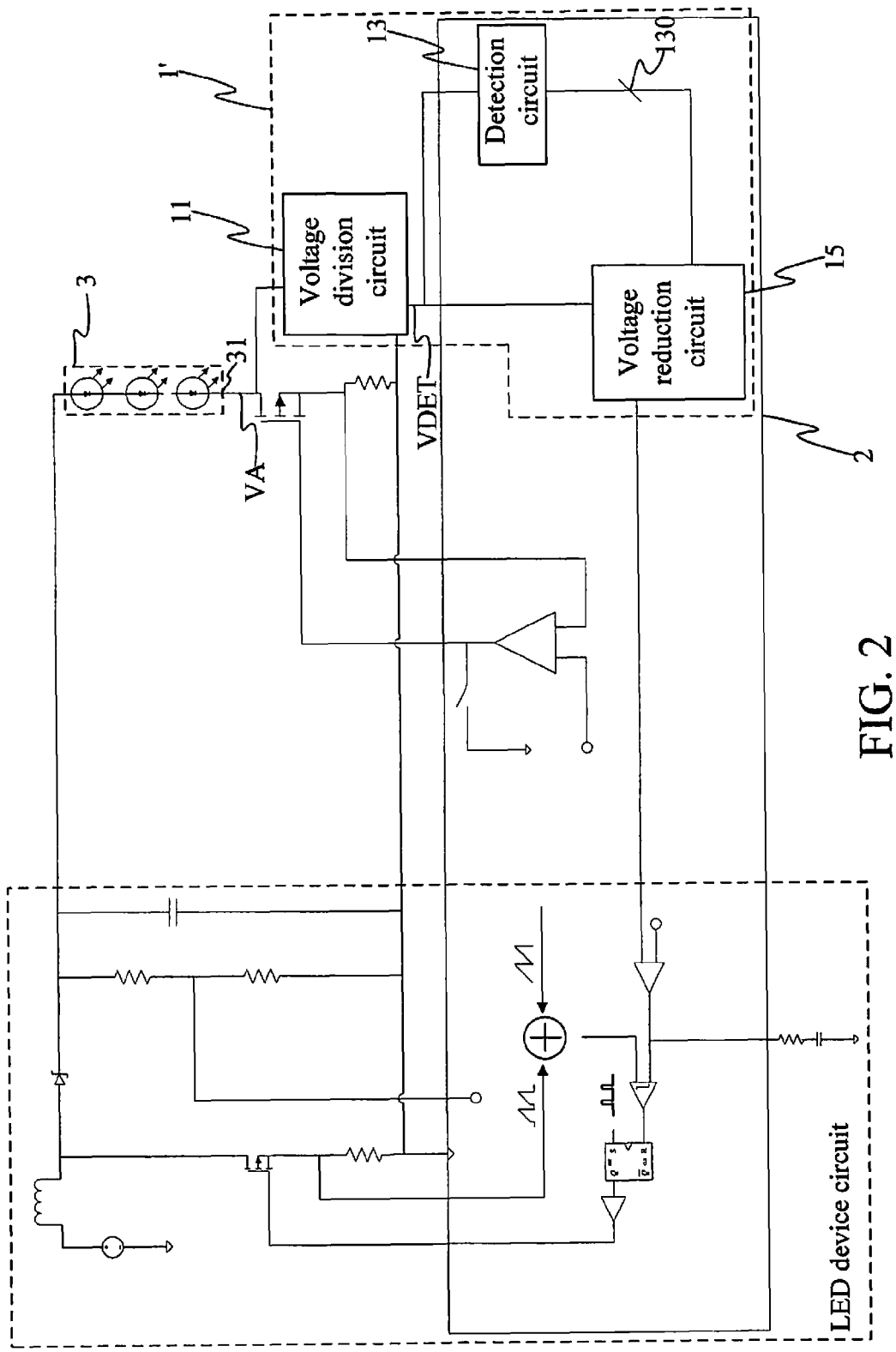
FIG. 2 is a schematic view of a protection circuit according to a second embodiment of the present invention.

Referring to FIG. 2, a schematic view of a protection circuit 1' according to a second embodiment of the present invention is shown therein. It shall be particularly appreciated that, the circuit architecture of the second embodiment is similar to that of the previous embodiment, so elements denoted by the same symbols have the same functions and will not be further described herein. However, the second embodiment differs from the first embodiment in that, the protection circuit 1' further comprises a detection circuit 13 which is disposed in the controlling IC 2 of the LED.

Specifically, the second embodiment of the present invention is mainly configured to determine, by means of the detection circuit 13, whether the voltage VDET input into the controlling IC 2 of the LED rises abnormally. If the voltage VDET rises abnormally, the voltage reduction circuit is activated to protect the controlling IC 2 of the LED. Similarly, the voltage division circuit 11 is coupled to the terminal 31 of the LED assembly 3 and configured to generate the division voltage VDET according to the terminal voltage VA of the terminal 31. In this case, the controlling IC 2 of the LED can withstand the normal division voltage VDET input when the LED assembly 3 operates normally.

However, when the division voltage VDET rises instantaneously due to malfunction of any LED in the LED assembly 3 (e.g., a short circuit occurring in part of the LEDs), the detection circuit 13 coupled to the voltage division circuit 11 will generate a detection signal 130 in response to the instantaneously rising division voltage VDET and transmit the detection signal 130 to the voltage reduction circuit 15. In other words, when determining that the division voltage VDET is larger than a standard voltage (for example, the voltage that the controlling IC 2 of the LED can withstand after the controlling IC 2 is integrated into the system on chip manufactured by the advanced process), the detection circuit 13 transmits the detection signal 130 to the voltage reduction circuit 15.

Subsequently, the voltage reduction circuit 15 coupled to the voltage division circuit 11 and the detection circuit 13 can activate the voltage reduction circuit to reduce the division voltage VDET of the voltage division circuit 11 according to the detection signal 130. In this way, the division voltage VDET input into the controlling IC 2 of the LED will not exceed the voltage value that the controlling IC 2 of the LED can withstand so as to protect the pins, via which the division voltage VDET is input into the controlling IC 2 of the LED, from being damaged. As a result, the protection circuit 1 can detect the voltage variation caused by the abnormality of the LED and reduce the voltage input into the controlling IC 2 of the LED so that the objective of protecting the controlling IC 2 of the LED is achieved when the IC is integrated into the system on chip manufactured by the advanced process.

Figure 3:
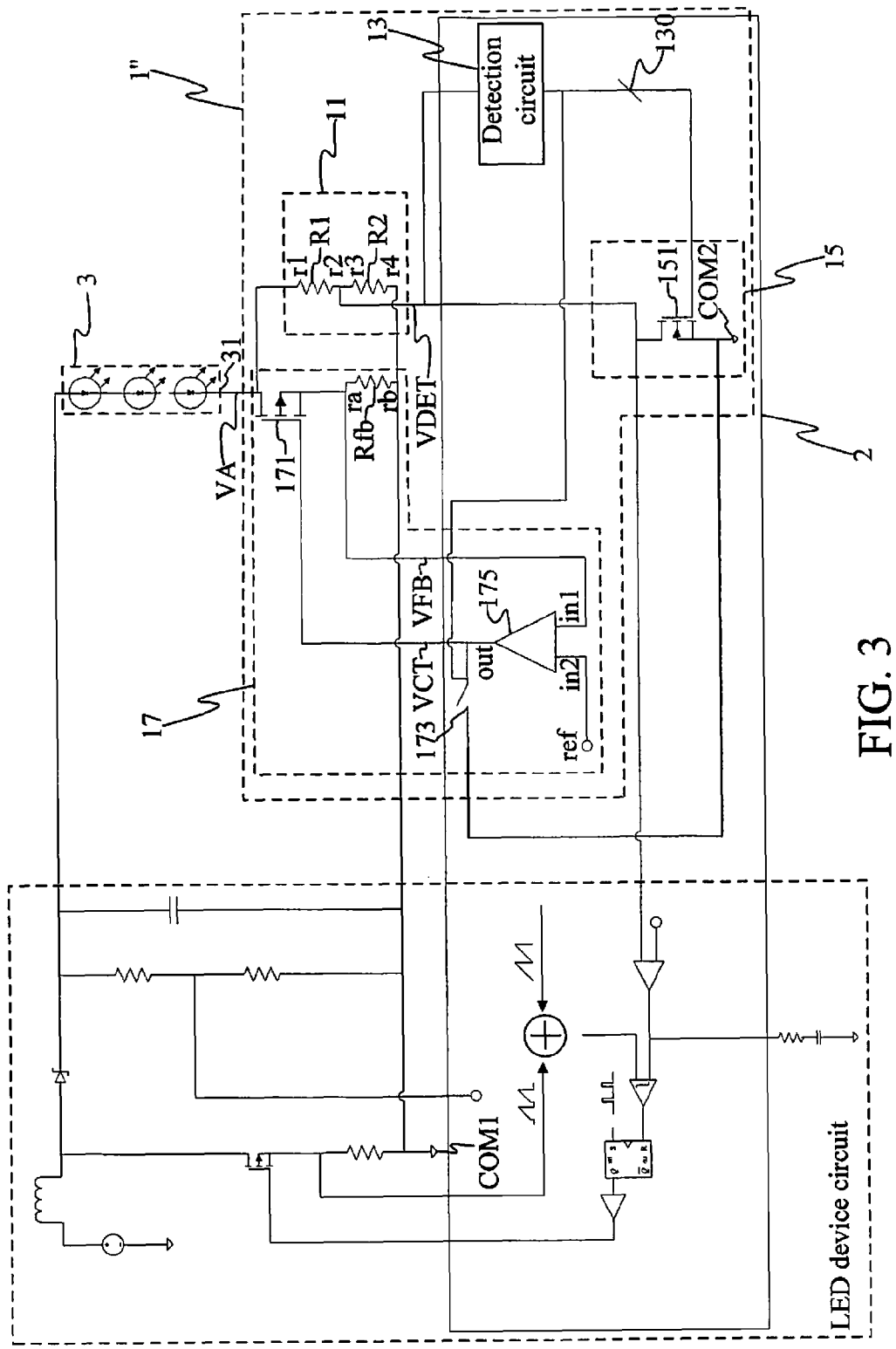
FIG. 3 is a schematic view of a protection circuit according to a third embodiment of the present invention.

Referring to FIG. 3, a schematic view of a protection circuit 1" of a third embodiment of the present invention is shown therein. It shall be particularly appreciated that, the circuit architecture of the third embodiment is similar to those of the previous embodiments, so elements denoted by the same symbols have the same functions and will not be further described herein. The third embodiment mainly describes in detail the possible implementations of the voltage division circuit and the voltage reduction circuit.

Specifically, the voltage division circuit 11 further comprises a first resistor R1 and a second resistor R2. The first resistor R1 has a first terminal r1 and a second terminal r2, and the second resistor R2 has a third terminal r3 and a fourth terminal r4. As shown in FIG. 3, the first terminal r1 is coupled to the LED assembly 3, the second terminal r2 is coupled to the third terminal r3, the detection circuit 13 and the voltage reduction circuit 15, and the fourth terminal r4 is coupled to a common terminal COM1. In this way, the voltage division circuit 11 can generate the division voltage VDET according to the terminal voltage VA.

Furthermore, the voltage reduction circuit 15 further comprises a switch element 151. As shown in FIG. 3, the switch element 151 is coupled to the voltage division circuit 11, the detection circuit 13 and a common terminal COM2. When the detection signal 130 is transmitted to the switch element 151 of the voltage reduction circuit 15, the switch element 151 will accordingly conduct the voltage division circuit 11 to the common terminal CMO2. In this way, the division voltage VDET of the voltage division circuit 11 can be reduced. It shall be particularly appreciated that, the switch element 151 may be a transistor (e.g., an NMOS field effect transistor), but this is not intended to limit the implementations of the switch element.

On the other hand, the protection circuit 1" further comprises a controlling circuit 17. The controlling circuit 17 is coupled to the terminal 31 of the LED assembly 3 and configured to control the current passing through the LED assembly 3. In more detail, the controlling circuit 17 comprises a linear controlling element 171 and a feedback resistor Rfb which are disposed outside the controlling IC 2 of the LED and an operational amplifier 175 which is disposed in the controlling IC 2 of the LED. The feedback resistor Rfb includes a first terminal ra and a second terminal rb, and the operational amplifier 175 includes a first receiving terminal in1, a second receiving terminal in2 and an output terminal out. Similarly, the linear controlling element 171 may be a transistor, but this is not intended to limit the implementations of the linear controlling element.

As shown in FIG. 3, the linear controlling element 171 is coupled to the terminal 31 of the LED assembly 3, the first terminal ra of the feedback resistor Rfb and the output terminal out of the operational amplifier 175, the first receiving terminal in1 of the operational amplifier 175 is coupled to the first terminal ra of the feedback resistor Rfb, the second receiving terminal in2 of the operational amplifier is coupled to a reference voltage terminal ref, and the second terminal of the feedback resistor Rfb is coupled to the common terminal COM1. In this way, the current passing through the LED assembly 3 can be controlled by the controlling circuit 17.

Likewise, in case of malfunction of any LED in the LED assembly 3, it must be ensured that, in the controlling circuit 17, the voltage input into the controlling IC 2 of the LED is lower than the voltage value that the controlling IC 2 of the LED can withstand. Therefore, the controlling circuit 17 may further comprise a switch element 173 disposed in the controlling IC 2 of the LED to reduce the voltage input into the controlling IC 2 of the LED in the controlling circuit 17. Similarly, dimming off process is implemented through the switch element 173.

Specifically, the switch element 173 is coupled to the output terminal out of the operational amplifier 175, the detection circuit 13 and the common terminal COM2. When the detection circuit 13 determines that the value of VA is excessively high (the value of VA can be calculated from VDET, R1 and R2), the detection signal 130 of the detection circuit 13 is also transmitted to the switch element 173. Accordingly, the switch element 173 will conduct the output terminal out of the operational amplifier 175 to the common terminal COM2 according to the detection signal 130. This ensures that in the controlling circuit 17, the output voltage VCT and the input voltage VFB of the controlling IC 2 of the LED are lower than the voltage value that the controlling IC 2 of the LED can withstand so as to protect the pins of the controlling IC 2 of the LED from being damaged. When the LED assembly 3 is dimming off, it is accomplished by holding back the current from passing through the LED assembly 3 after conducting the output terminal of the operational amplifier 175 to the common terminal COM2.

Figure 4:
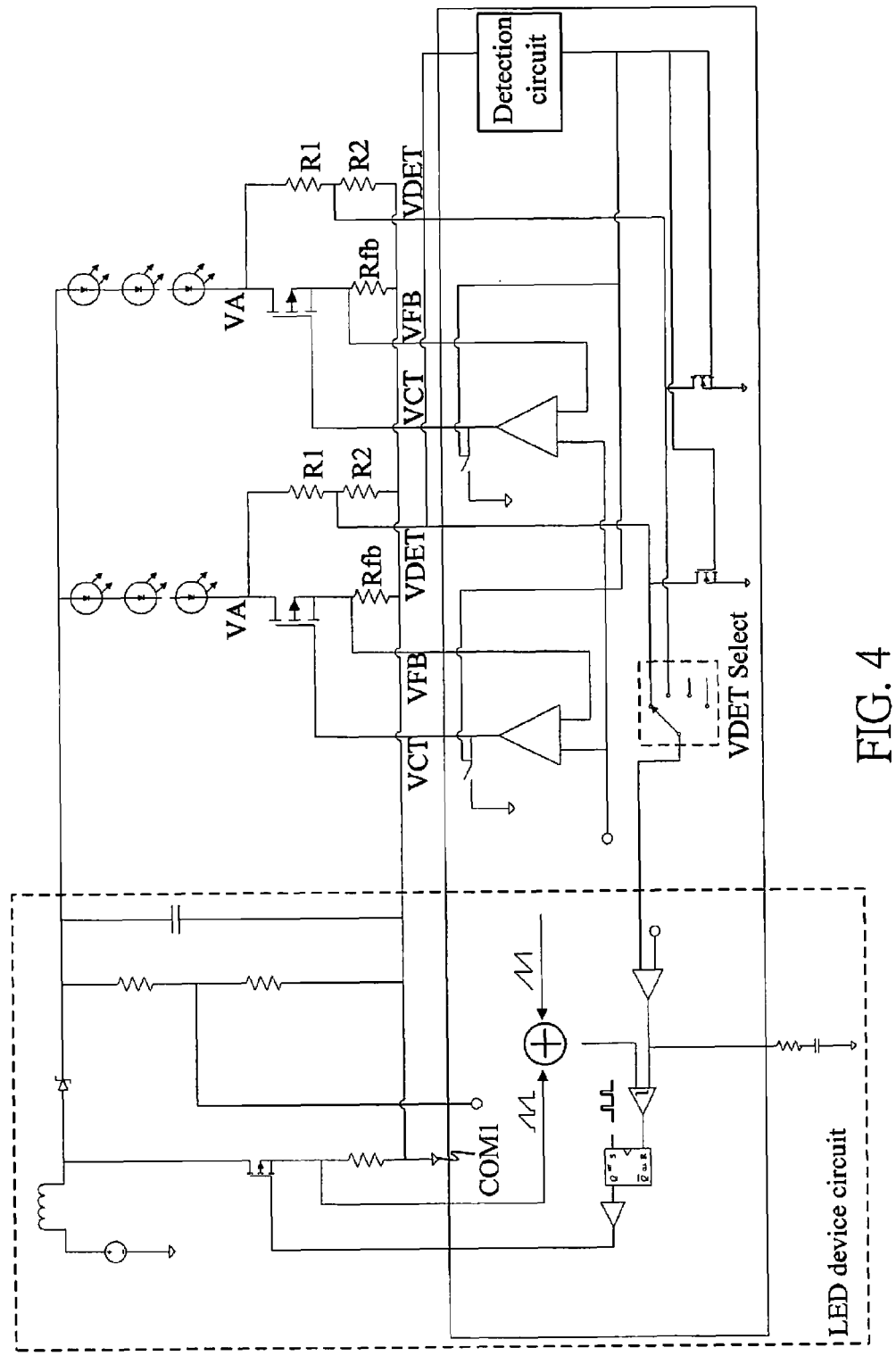
FIG. 4 is a schematic view of a protection circuit according to a fourth embodiment of the present invention.

Referring to FIG. 4, a schematic view of a protection circuit according to a fourth embodiment of the present invention is shown therein. The fourth embodiment mainly illustrates how the protection circuit of the present invention is applied to the multi-channel LED circuit assembly. As shown in FIG. 4, each of the LED assemblies has a set of corresponding protection circuits, and by means of the voltage division circuit, the detection circuit, the voltage reduction circuit and the controlling circuit, each set of protection circuits can reduce the excessively high voltage input into the controlling IC of the LED so as to ensure that the whole LED device circuit can operate normally instead of being damaged. However, how to configure such a detection circuit belongs to the conventional technologies, so it will not be further described herein.

According to the above descriptions, in case of a dimming off process of the LED or malfunction (e.g., a short circuit) of part of the LEDs, the protection circuit of the present invention can activate the voltage reduction circuit to reduce the voltage input into the controlling IC so that the pins of the circuit are prevented from withstanding a high voltage. Thereby, the objective of protecting the controlling IC of the LED is achieved when the IC is integrated into the system on chip manufactured by the advanced process.

What is claimed is:

1. A protection circuit for use in a controlling integrated circuit (IC) of a light emitting diode (LED), comprising:
    a voltage division circuit, being coupled to a terminal of an LED assembly, and configured to generate a division voltage according to a terminal voltage of the terminal; and
    a voltage reduction circuit, being coupled to the voltage division circuit, and configured to reduce the division voltage of the voltage division circuit;
    a detection circuit, being coupled to the voltage division circuit and the voltage reduction circuit, and configured to generate a detection signal according to the division voltage;
    wherein the voltage division circuit is disposed outside the controlling IC of the LED, the voltage reduction circuit is disposed in the controlling IC of the LED, the voltage reduction circuit is configured to reduce the division voltage of the voltage division circuit according to the detection signal, and the detection circuit is disposed in the controlling IC of the LED.

2. The protection circuit as claimed in claim 1, wherein the detection circuit is configured to generate the detection signal after determining that the division voltage is greater than a standard voltage.

3. The protection circuit as claimed in claim 1, wherein the voltage division circuit further comprises:
    a first resistor, having a first terminal and a second terminal;
    a second resistor, having a third terminal and a fourth terminal;
    wherein the first terminal of the first resistor is coupled to the LED assembly, the second terminal of the first resistor is coupled to the third terminal of the second resistor, the detection circuit and the voltage reduction circuit, and the fourth terminal of the second resistor is coupled to a common terminal.

4. The protection circuit as claimed in claim 1, wherein the voltage reduction circuit further comprises:
    a switch element, being coupled to the voltage division circuit, the detection circuit and a common terminal, and configured to conduct the voltage division circuit to the common terminal according to the detection signal for reducing the division voltage of the voltage division circuit.

5. The protection circuit as claimed in claim 4, wherein the switch element is a transistor.

6. The protection circuit as claimed in claim 1, further comprising:
    a controlling circuit, being coupled to the terminal of the LED assembly, and configured to control the current passing through the LED assembly.

7. The protection circuit as claimed in claim 6, wherein the controlling circuit further comprises:
    a linear controlling element;
    a feedback resistor, including a first terminal and a second terminal;
    an operational amplifier, including a first receiving terminal, a second receiving terminal and an output terminal;
    wherein the linear controlling element is coupled to the terminal of the LED assembly, the first terminal of the feedback resistor and the output terminal of the operational amplifier, the first receiving terminal of the operational amplifier is coupled to the first terminal of the feedback resistor, the second receiving terminal of the operational amplifier is coupled to a reference voltage terminal, and the second terminal of the feedback resistor is coupled to a first common terminal.

8. The protection circuit as claimed in claim 7, further comprising:
    a switch element, being coupled to the output terminal of the operational amplifier, the detection circuit and a second common terminal, and configured to conduct the output terminal of the operational amplifier to the second common terminal according to the detection signal or undergo a dimming off process.

9. The protection circuit as claimed in claim 8, wherein the linear controlling element and the feedback resistor are disposed outside the controlling IC of the LED, and the operational amplifier and the switch element are disposed in the controlling IC of the LED.

10. The protection circuit as claimed in claim 7, wherein the linear controlling element is a transistor.

* * * * *